United States Patent
Khadiwala et al.

(10) Patent No.: US 10,613,948 B2
(45) Date of Patent: Apr. 7, 2020

(54) REPAIRING PARTIALLY COMPLETED TRANSACTIONS IN FAST CONSENSUS PROTOCOL

(71) Applicant: International Business Machines Corporation, Armonk, NY (US)

(72) Inventors: Ravi Khadiwala, Bartlett, IL (US); Gregory R. Dhuse, Chicago, IL (US); Jason Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 15/692,232

(22) Filed: Aug. 31, 2017

(65) Prior Publication Data
US 2019/0065328 A1 Feb. 28, 2019

(51) Int. Cl.
*G06F 16/00* (2019.01)
*G06F 11/14* (2006.01)
(Continued)

(52) U.S. Cl.
CPC ...... *G06F 11/1474* (2013.01); *G06F 11/1662* (2013.01); *G06F 16/9024* (2019.01);
(Continued)

(58) Field of Classification Search
CPC ............. G06F 11/1474; G06F 11/1662; G06F 11/1469; G06F 16/9024; G06F 16/00; G06F 17/30; G06F 17/30958; G06F 2201/835; G06F 9/466; G06F 11/1084; G06F 11/0727; G06F 11/0778; G06F 11/3006;
(Continued)

(56) References Cited

U.S. PATENT DOCUMENTS 6,466,965 B1 * 10/2002 Chessell ................. G06F 9/466
709/203
9,848,044 B2 12/2017 Leggette et al.
(Continued)

OTHER PUBLICATIONS

Khadiwala et al., "Repairing Partially Completed Transactions in Fast Consensus Protocol", U.S. Appl. No. 15/891,538, filed Feb. 8, 2018, 22 pages.
(Continued)

*Primary Examiner* — Anh Ly
(74) *Attorney, Agent, or Firm* — Stephanie L. Carusillo (57) ABSTRACT

In an approach, a processor detects a transmission control protocol disconnection of a first distributed storage unit from a distributed storage network, wherein the distributed storage network comprises a set of distributed storage units. A processor identifies a transaction, wherein: the transaction is not in a final state, the transaction is a first proposal, from the first distributed storage unit, for the set of distributed storage units to store a dataset with a first revision number within the distributed storage network, and the dataset is broken into one or more data pieces to be written on the set of distributed storage units of the distributed storage network that approve the proposal. A processor identifies a timestamp of the transaction. A processor determines a stage the transaction has reached. A processor places the transaction in a final state based on the determined stage the transaction has reached.

8 Claims, 3 Drawing Sheets

(51) Int. Cl.
*G06F 11/16* (2006.01)
*G06F 16/901* (2019.01)

(52) U.S. Cl.
CPC ...... *G06F 11/1469* (2013.01); *G06F 2201/81* (2013.01); *G06F 2201/82* (2013.01); *G06F 2201/835* (2013.01)

(58) Field of Classification Search
CPC ......... G06F 17/30082; G06F 17/30008; G06F 17/30286
See application file for complete search history.

(56) References Cited

U.S. PATENT DOCUMENTS

| | | | |
|---|---|---|---|
| 10,282,457 B1 | 5/2019 | Chen et al. | |
| 2004/0230624 A1 | 11/2004 | Frolund et al. | |
| 2005/0120025 A1 | 6/2005 | Rodriguez et al. | |
| 2005/0289231 A1* | 12/2005 | Harada | G06Q 10/00 709/224 |
| 2006/0047925 A1 | 3/2006 | Perry | |
| 2009/0216580 A1* | 8/2009 | Bailey | G06Q 10/063 705/7.27 |
| 2011/0106855 A1* | 5/2011 | Resch | H04L 12/00 707/793 |
| 2011/0184912 A1* | 7/2011 | Baptist | G06F 11/1448 707/639 |
| 2012/0054456 A1* | 3/2012 | Grube | G06F 3/0619 711/158 |
| 2012/0109885 A1* | 5/2012 | Grube | G06F 16/972 707/609 |
| 2012/0166757 A1 | 6/2012 | Volvovski | |
| 2012/0232947 A1* | 9/2012 | McLachlan | G06Q 10/06 705/7.23 |
| 2013/0110774 A1 | 5/2013 | Shah et al. | |
| 2013/0232152 A1* | 9/2013 | Dhuse | G06F 3/067 707/741 |
| 2013/0238900 A1* | 9/2013 | Leggette | H04L 63/0428 713/165 |
| 2014/0025521 A1* | 1/2014 | Alsina | G06Q 30/0601 705/26.1 |
| 2014/0123316 A1 | 5/2014 | Leggette | |
| 2014/0330921 A1* | 11/2014 | Storm | H04L 67/1097 709/213 |
| 2014/0330923 A1* | 11/2014 | Baptist | G06F 11/1076 709/213 |
| 2014/0351535 A1* | 11/2014 | Santry | G06F 3/065 711/162 |
| 2015/0121131 A1 | 4/2015 | Kiselev | |
| 2015/0269539 A1* | 9/2015 | MacGregor | G06Q 20/065 705/39 |
| 2015/0269541 A1* | 9/2015 | MacGregor | G06Q 20/10 705/39 |
| 2016/0117337 A1 | 4/2016 | Aron et al. | |
| 2019/0065328 A1* | 2/2019 | Khadiwala | G06F 11/1474 |
| 2019/0140935 A1 | 5/2019 | Kikinis | |

OTHER PUBLICATIONS

IBM, List of Patent Applications Treated As Related, Appendix P, Dated Feb. 5, 2018, 2 pages.
IBM, "List of Patent Applications Treated As Related", Appendix P, filed herewith, 2 pages.
Khadiwala et al., "Repairing Partially Completed Transactions in Fast Consensus Protocol", U.S. Appl. No. 16/517,841, filed Jul. 22, 2019, 26 pages.
Khadiwala et al., "Repairing Partially Completed Transactions in Fast Consensus Protocol", U.S. Appl. No. 16/519,493, filed Jul. 23, 2019, 25 pages.
U.S. Appl. No. 16/382,452, filed Apr. 12, 2019.

* cited by examiner

REPAIRING PARTIALLY COMPLETED TRANSACTIONS IN FAST CONSENSUS PROTOCOL

BACKGROUND

The present invention relates generally to the field of dispersed storage computer networks, and more particularly to repairing partially completed transactions from fast consensus protocol in dispersed storage computer networks.

A dispersed, or distributed, storage computer network (DSN) is a computer network where information is stored on more than one node or DS unit within the network, often in a replicated fashion. In a DSN, when more than one proposer attempts to update the same revision/version of a data source at the same time, contention arises. The proposers in this case are generally two or more DS processing units attempting to update the same data source (segment or data source representing the meta-data object) at the same time. Since strong consistency is a desirable property for a DSN, some form of consensus protocol is generally required. Typically, if all actors in the system follow such a protocol, strong consistency is insured. In addition, it is advantageous for consensus to be achievable in a single round-trip in the contented case while performing acceptably.

Protocols, such as Paxos, were developed to establish a distinguished client using an out-of-band process to deal with consensus issues. A goal of Paxos is for some number of peers to reach an agreement on a value; Paxos guarantees that if one peer believes some value has been agreed upon by a majority, the majority will never agree on a different value. The protocol is designed such that any agreement must go through a majority of nodes. The out-of-band process of Paxos may add overhead to the DSN because round trips may be required. Strong consistency properties are achieved during an overwrite of a specific revision or the initial right of some sort's name in DSN memory (sometimes called "a contest"). Multiple DS processing units participate in the same contest if they attempt to update the same revision of a data source stored in the same DSN memory. A variant of Paxos, called "Fast Paxos" was developed to enable consensus to be established in a single network round trip time (RTT) in the ideal case of no contention. Fast Paxos generally has separate distinct phases for: 1) electing a leader; and 2) proposing new values for consensus.

SUMMARY

Aspects of an embodiment of the present invention disclose a method, computer program product, and computer system. A processor detects a transmission control protocol disconnection of a first distributed storage unit from a distributed storage network, wherein the distributed storage network comprises a set of distributed storage units. A processor identifies a transaction, wherein: the transaction is not in a final state, the transaction is a first proposal, from the first distributed storage unit, for the set of distributed storage units to store a dataset with a first revision number within the distributed storage network, and the dataset is broken into one or more data pieces to be written on the set of distributed storage units of the distributed storage network that approve the proposal. A processor identifies a timestamp of the transaction. A processor determines a stage the transaction has reached. A processor places the transaction in a final state based on the determined stage the transaction has reached.

DETAILED DESCRIPTION

Embodiments of the present invention recognize that fast consensus protocols reach consensus in a single round-trip, such as Fast Paxos and Fast Paxos with Implicit Leader Election (FPILE). While it is advantageous for consensus to be achievable in a single round-trip, the downside of a single round-trip consensus is a lack of a second "commit" phase. This creates a problem within DS systems that work via erasure coding of causing there to be no natural place/time to clean up a partially completed transaction when a DS processing unit driving the transaction (i.e., a proposer) crashes at any point before successfully completing the transaction.

A transaction is the overall process taken to obtain a consensus from DS units within a DS network (DSN) to encode data via erasure coding or make a revision to data encoded via erasure coding to the DS units within the DSN. Erasure encoding breaks data into a width or number of pieces with some redundancy, such that if any threshold of those pieces are obtained, the original data can be reconstructed. Typically, each width piece is stored on a different storage node (i.e. DS unit). A proposer initiates a transaction by sending out a "propose" message (i.e. write request) to each DS unit in which a width piece of data could be encoded and stored on (i.e. a width of DS units). A proposer's write request succeeds if some write threshold of pieces are successfully written to the width of DS units. The write threshold is the number of DS units that must accept the proposal made by the proposer for that proposal to achieve consensus, where the write threshold can be less than the width. When the transaction is successful, there is a finalize phase that removes any previous revisions or competitor's proposals that are no longer required.

Since strong consistency is a top priority for a DSN, there is no correctness concern with leaving partially completed transactions on the DSN memory. Embodiments of the present invention recognize that leaving partially completely transactions on the DSN memory unnecessarily consumes space resources in DSN memory. In this manner, as discussed in greater detail herein, embodiments of the present invention provide a rebuilder DS unit that identifies partially completed transactions and takes appropriate action, depending on what stage of the transaction the proposer was at when it failed, to leave the transaction in a final state. Appropriate action may include conducting the finalize phase in which previous revisions and competing proposals are removed.

Embodiments of the present invention further recognize the difficulty in determining when a proposer has crashed and/or failed, so a rebuilder DS unit cleaning up partially completed transactions must proceed in a way that won't allow a proposer to believe the proposer succeeded when the proposer actually failed at some stage of completing a transaction.

The present invention will now be described in detail with reference to the Figures.

Figure 1:
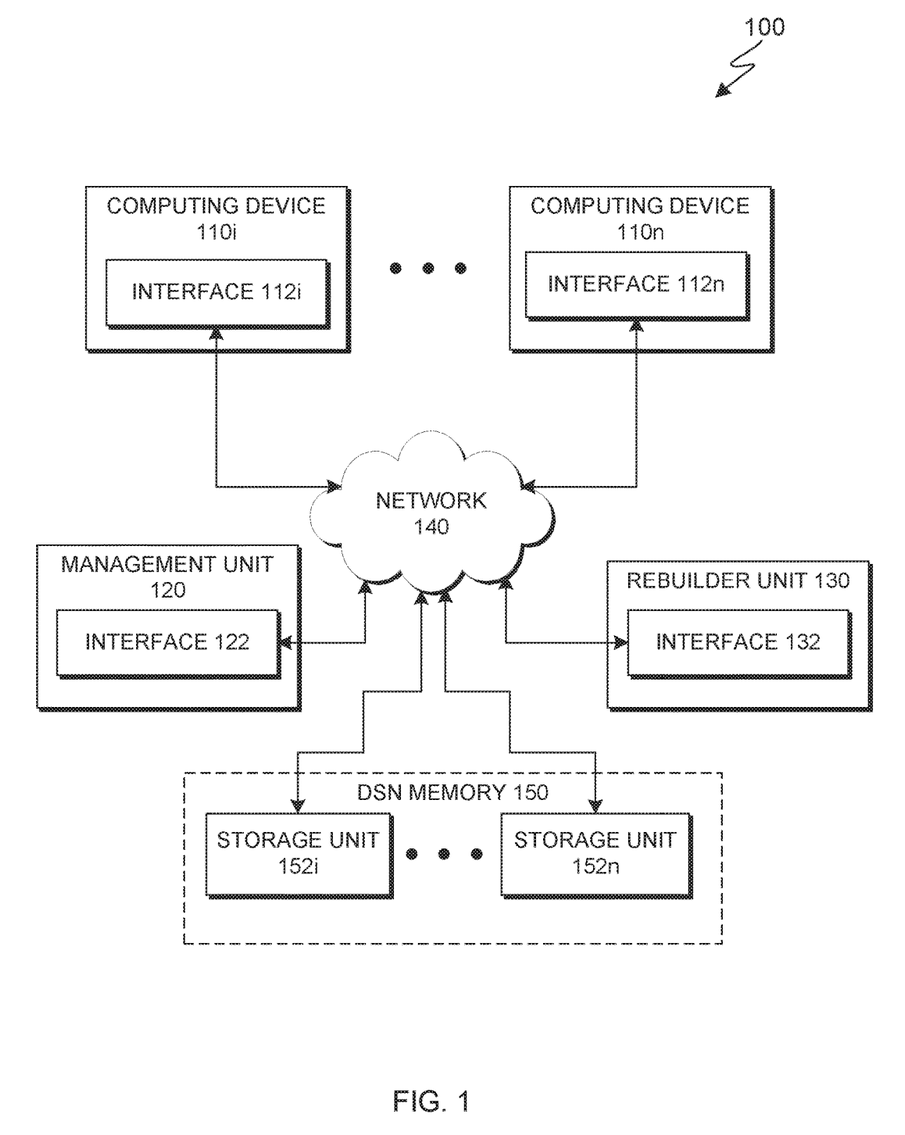
FIG. 1 is a schematic block diagram of an embodiment of a dispersed, or distributed, storage network (DSN), in accordance with an embodiment of the present invention.

FIG. 1 is a schematic block diagram of an embodiment of a dispersed, or distributed, storage network (DSN) 100. FIG. 1 provides only an illustration of one embodiment and does not imply any limitations with regard to the environments in which different embodiments may be implemented. In the depicted embodiment, DSN 100 includes a plurality of DS units in the form of computing devices 110i through 110n, management unit 120, rebuilder unit 130, and DSN memory 150. DSN 100 may include additional DS units in the form of computing devices, servers, user devices, or other devices not shown.

The components of DSN 100 are coupled to network 140. Network 140 may be a local area network (LAN), a wide area network (WAN) such as the Internet, the public switched telephone network (PSTN), a mobile broadband network, such as a 4G and Long Term Evolution (LTE), any combination thereof, or any combination of connections and protocols that will support communications between computing devices 110i through 110n, management unit 120, rebuilder unit 130, and DSN memory 150, in accordance with embodiments of the invention. Network 140 may include wired, wireless, or fiber optic connections.

Computing devices 110i through 110n operate as DS processing units that may be a portable computing device and/or a fixed computing device. Each of computing devices 110i through 110n are capable of being a proposer of a transaction A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that management unit 120 and rebuilder unit 130 may be separate computing devices, may be a common computing device, and/or may be integrated into one or more of the computing devices 110i through 100n and/or into one or more of the storage units 152i through 152n. Computing devices 110i through 110n, management unit 120, and rebuilder unit 130 may include components as depicted and described in further detail with respect to FIG. 3.

Each of computing devices 110i through 110n, management unit 120, and rebuilder unit 130 include an interface, as seen in FIG. 1. Each interface includes software and hardware to support one or more communication links via network 140 indirectly and/or directly. Each of computing devices 110i through 110n are capable of communicating with DSN memory 150, and therefore, are capable of being a proposer of a transaction.

DSN memory 150 includes a plurality of DS units, such as storage units 152i through 152n, that may be located at geographically different sites (e.g., one in Chicago, one in Milwaukee, etc.), at a common site, or a combination thereof. For example, DSN memory 150 includes eight storage units and each storage unit is located at a different site. As another example, DSN memory 150 includes eight storage units and all eight storage units are located at the same site. As yet another example, DSN memory 150 includes eight storage units and a first pair of storage units are at a first common site, a second pair of storage units are at a second common site, a third pair of storage units are at a third common site, and a fourth pair of storage units are at a fourth common site. Note that DSN memory 150 may include any number of storage units.

In operation, management unit 120 performs DS management services. For example, management unit 120 establishes distributed data storage parameters (e.g., vault creation, distributed storage parameters, security parameters, billing information, user profile information, etc.) for computing devices 110i through 110n individually or as part of a group of user devices. As a specific example, management unit 120 coordinates creation of a vault (e.g., a virtual memory block associated with a portion of an overall namespace of DSN 100) within DSN memory 150 for a computing device, a group of devices, or for public access and establishes per vault dispersed storage (DS) error encoding parameters for a vault. Management unit 120 facilitates storage of DS error encoding parameters for each vault by updating registry information of DSN 100, where the registry information may be stored in DSN memory 150, computing devices 110i through 110n, management unit 120, and/or the rebuilder unit 130.

Management unit 120 creates and stores user profile information (e.g., an access control list (ACL)) in local memory and/or within memory of DSN memory 150. The user profile information includes authentication information, permissions, and/or the security parameters. The security parameters may include encryption/decryption scheme, one or more encryption keys, key generation scheme, and/or data encoding/decoding scheme.

Management unit 120 creates billing information for a particular user, a user group, a vault access, public vault access, etc. For instance, the management unit 120 tracks the number of times a user accesses a non-public vault and/or public vaults, which can be used to generate a per-access billing information. In another instance, the management unit 120 tracks the amount of data stored and/or retrieved by a user device and/or a user group, which can be used to generate a per-data-amount billing information.

As another example, management unit 120 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices) to/from DSN 100, and/or establishing authentication credentials for storage units 152i through 152n. Network administration includes monitoring devices and/or units for failures, maintaining vault information, determining device and/or unit activation status, determining device and/or unit loading, and/or determining any other system level operation that affects the performance level of DSN 100. Network maintenance includes facilitating replacing, upgrading, repairing, and/or expanding a device and/or unit of DSN 100.

Rebuilder unit 130 performs rebuilding of 'bad' or missing encoded data pieces caused by a proposer crashing before completing a transaction. In an embodiment, rebuilder unit 130 performs this rebuilding by identifying partially completed transactions and taking appropriate action, depending on what stage of the transaction the proposer was at when it failed and/or crashed, to leave the transaction in a final state. For example, if the proposer crashed before consensus was reached and consensus is reached, rebuilder unit 130 completes the finalize phase by removing previous revisions and competing proposals. An advantage to ensuring that this finalize phase is completed is the finalize phase allows subsequent readers to read an agreed item of the proposal without verifying that the original proposal was accepted by a write threshold of DS units.

In an embodiment, rebuilder unit 130 can detect that a proposer has crashed when the proposer used a TCP connection to communicate with a width of DS units within DSN 100 and rebuilder unit 130 identifies a disconnection of the TCP connection. In an embodiment, rebuilder unit 130 can identify a partially completed transaction and an associated timestamp. In an embodiment, rebuilder unit 130 can determine what stage the transaction has reached before the disconnection and based on that determination can take appropriate action to leave the transaction in a final state. The process rebuilder unit follows to clean up partially completed transactions is described in more detailed in FIG. 2.

In the depicted embodiment, rebuilder unit 130 is a separate unit within DSN 100 with interface connection to all components of DSN 100 through network 140. In another embodiment, rebuilder unit 130 may reside elsewhere within DSN 100 such as within one of the computing devices or storage units, provided rebuilder unit 130 has access to network 140. Rebuilder unit 130 is described in further detail with respect to FIG. 2.

Figure 2:
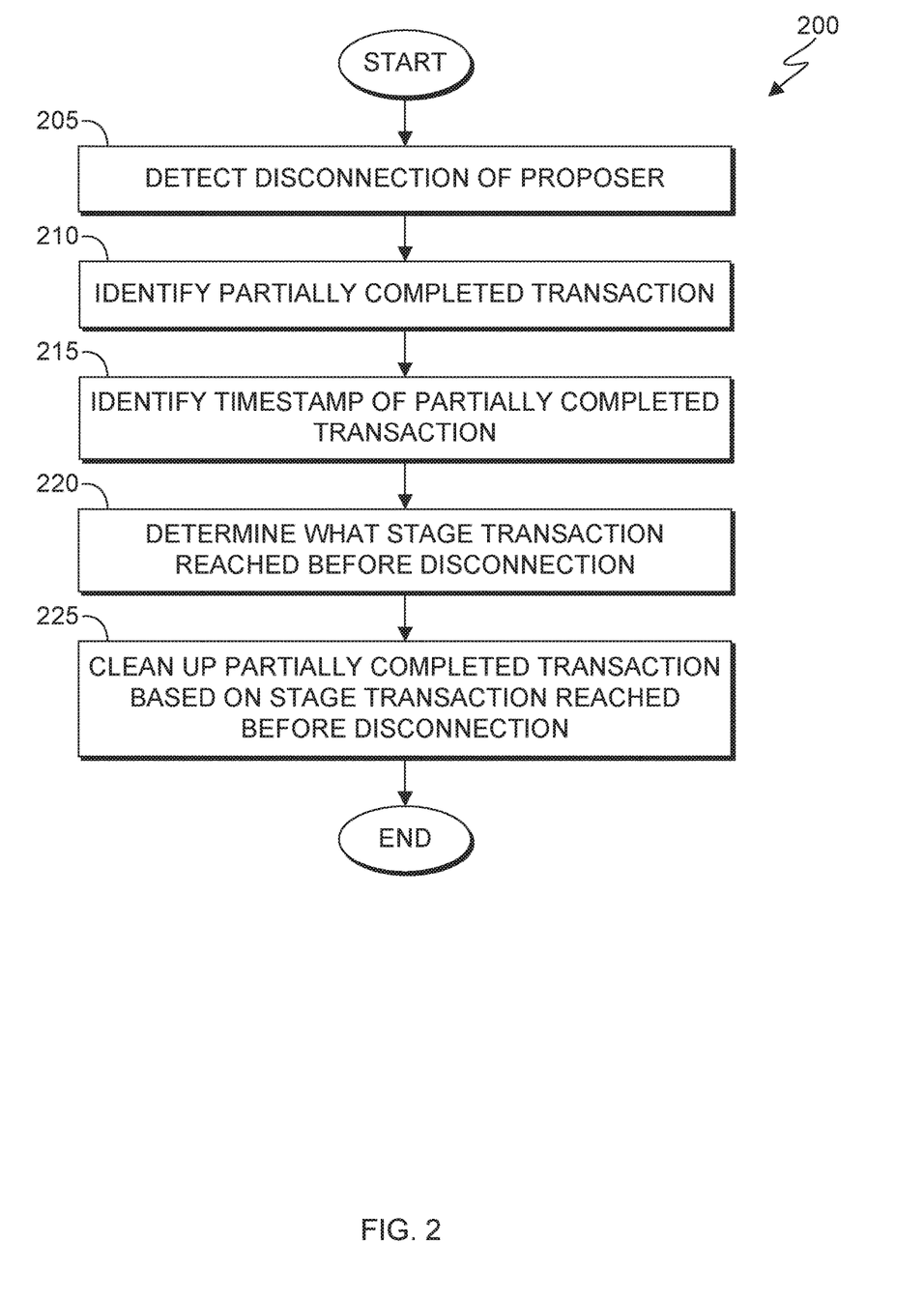
FIG. 2 is a flowchart depicting operational steps of a rebuilder unit executing within the dispersed storage network (DSN) of FIG. 1, in accordance with an embodiment of the present invention.

FIG. 2 is a flowchart depicting operational steps of rebuilder unit 130 executing within DSN 100 of FIG. 1, in accordance with an embodiment of the present invention. In the depicted embodiment, rebuilder unit 130 operates to identify partially completed transactions and take appropriate action, depending on what stage of the transaction the proposer was at when it failed and/or crashed, to leave the transaction in a final state. It should be appreciated that the process depicted in FIG. 2 illustrates one possible execution of rebuilder unit 130.

In step 205, rebuilder unit 130 detects a disconnection of a proposer. In an embodiment, rebuilder unit 130 detects a disconnection by a proposer who used a TCP connection to communicate with a width of DS units including rebuilder unit 130 within DSN 100. In some embodiments, rebuilder unit 130 does not detect a disconnection and the process begins at step 210.

In step 210, rebuilder unit 130 identifies a partially completed transaction. In an embodiment, rebuilder unit 130 identifies a partially completed transaction on a DS unit. In several embodiments, rebuilder unit 130 is a DS unit with the width of DS units. In an embodiment, rebuilder unit 130 identifies a partially completed transaction on a DS unit within the width of DS units, including rebuilder unit 130, the proposer had established a TCP connection with and then rebuilder unit 130 detected the disconnection. In an embodiment, rebuilder unit 130 identifies a partially completed transaction by identifying a piece of data on the DS unit. In an embodiment, rebuilder unit 130 identifies a partially completed transaction by searching one or more DS units. In an embodiment, rebuilder unit 130 searches one or more DS units and keeps a list of proposals that have not been finalized. In another embodiment, in which rebuilder unit 130 is within the width of DS units involved in the transaction, rebuilder unit 130 knows when the transaction has not been finalized and checks the status of the transaction that has not been finalized by issuing read requests to the other width DS units. In yet another embodiment, rebuilder unit 130 issues read requests only when the width of DS units has over a threshold number of non-finalized transactions.

In step 215, rebuilder unit 130 identifies a timestamp of the partially completed transaction. In an embodiment, rebuilder unit 130 identifies a timestamp included in the metadata of the transaction by the proposer. In an embodiment, rebuilder unit 130 will only clean up the partially completed transaction if the timestamp meets or surpasses a predetermined threshold. For example, rebuilder unit 130 will clean up the partially completed transaction with a timestamp of five minutes or more.

In step 220, rebuilder unit 130 determines what stage the transaction reached before the disconnection. In an embodiment, rebuilder unit 130 determines what stage the transaction reached before the disconnection by issuing read requests for an item in the transaction. In one example, rebuilder unit 130 may read that the transaction was successful and finalized and no further action is needed. In another example, rebuilder unit 130 may read that the transaction was successful, a write threshold of DS units accepted the proposal, but the transaction has not been finalized. In yet another example, rebuilder unit 130 may read that the transaction is not yet successful, but at least a threshold of DS units have received the proposal. In yet another example, rebuilder unit 130 may read that the transaction is not yet successful and the original data cannot be reconstructed.

In step 225, rebuilder unit 130 cleans up the partially completed transaction based on what stage the transaction reached before the disconnection. Rebuilder unit 130 cleans up the partially completed transaction while preserving the consensus protocol goals of consistency and safety.

In an embodiment, if rebuilder unit 130 determines the transaction was successful but has not been finalized, rebuilder unit 130 issues finalize messages marking the transaction successful for future readers and cleanup messages to remove previous revisions of the data and other failed transactions that competed with proposer's successful transaction.

In another embodiment, if rebuilder unit 130 determines the transaction is not yet successful but at least a threshold of DS units have received the proposal, rebuilder unit 130 uses the threshold pieces to reconstruct the original data and completes the original proposal by proposing the same proposal on the DS units that need to accept it to reach the write threshold.

In yet another embodiment, if rebuilder unit 130 determines the transaction is not yet successful and the original data cannot be reconstructed because a threshold of DS units have not received the proposal, rebuilder unit 130 competes with the crashed proposer. Rebuilder unit 130 competes with the crashed proposer by attempting to complete a transaction of its own that keeps the same data as in the crashed proposer's partially completed transaction and merely updates a version number, or revision, of the data.

In another embodiment, if rebuilder unit 130 determines the proposer crashed before achieving a write threshold but after achieving a threshold, rebuilder unit 130 competes with the crashed proposer by attempting to complete a transaction of its own that keeps the same data as in the crashed proposer's partially completed transaction and merely updates a version number, or revision, of the data.

In this way, rebuilder unit 130 cleans up a partially completed transaction caused by a proposer crashing before completing the transaction when fast consensus protocols are in place. Consensus protocols guarantee consistency and safety, but consensus protocols are not concerned by leaving partially completed transactions on the DSN memory, which unnecessarily consumes space resources.

Figure 3:
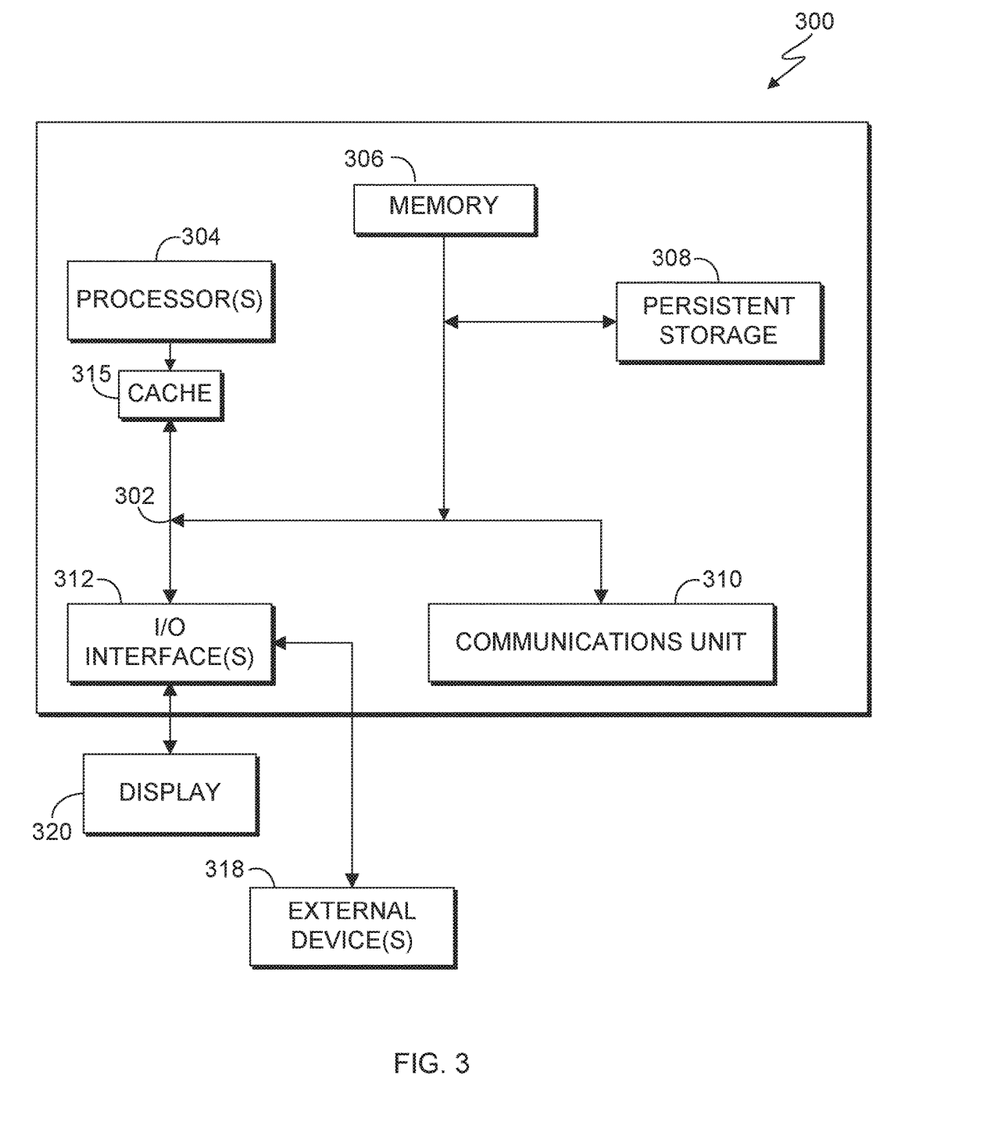
FIG. 3 is a schematic block diagram of components of a computing device of DSN of FIG. 1, in accordance with an embodiment of the present invention.

FIG. 3 is a block diagram depicting components of a computer 300, such as computing devices 110i through 110n from FIG. 1. FIG. 3 displays the computer 300, the one or more processor(s) 304 (including one or more computer processors), the communications fabric 302, the memory 306, the cache 316, the persistent storage 308, the communications unit 310, the I/O interfaces 312, the display 320, and the external devices 318. It should be appreciated that FIG. 3 provides only an illustration of one embodiment and does not imply any limitations with regard to the environments in which different embodiments may be implemented. Many modifications to the depicted environment may be made.

As depicted, the computer 300 operates over a communications fabric 302, which provides communications between the cache 316, the computer processor(s) 304, the memory 306, the persistent storage 308, the communications unit 310, and the input/output (I/O) interface(s) 312. The communications fabric 302 may be implemented with any architecture suitable for passing data and/or control information between the processors 304 (e.g., microprocessors, communications processors, and network processors, etc.), the memory 306, the external devices 318, and any other hardware components within a system. For example, the communications fabric 302 may be implemented with one or more buses or a crossbar switch.

The memory 306 and persistent storage 308 are computer readable storage media. In the depicted embodiment, the memory 306 includes a random access memory (RAM). In general, the memory 306 may include any suitable volatile or non-volatile implementations of one or more computer readable storage media. The cache 316 is a fast memory that enhances the performance of computer processor(s) 304 by holding recently accessed data, and data near accessed data, from memory 306.

Program instructions for programs may be stored in the persistent storage 308 or in memory 306, or more generally, any computer readable storage media, for execution by one or more of the respective computer processors 304 via the cache 316. The persistent storage 308 may include a magnetic hard disk drive. Alternatively, or in addition to a magnetic hard disk drive, the persistent storage 308 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 310, in these examples, provides for communications with other data processing systems or devices. In these examples, the communications unit 310 may include one or more network interface cards. The communications unit 310 may provide communications through the use of either or both physical and wireless communications links. Any programs may be downloaded to the persistent storage 308 through the communications unit 310. In the context of some embodiments of the present invention, the source of the various input data may be physically remote to the computer 300 such that the input data may be received and the output similarly transmitted via the communications unit 310.

The I/O interface(s) 312 allows for input and output of data with other devices that may operate in conjunction with the computer 300. For example, the I/O interface 312 may provide a connection to the external devices 318, which may include a keyboard, keypad, a touch screen, and/or some other suitable input devices. External devices 318 may also include portable computer readable storage media, for example, thumb drives, portable optical or magnetic disks, and memory cards. Software and data used to practice embodiments of the present invention may be stored on such portable computer readable storage media and may be loaded onto the persistent storage 308 via the I/O interface(s) 312. The I/O interface(s) 312 may similarly connect to a display 320. The display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), a mobile broadband network, such as a 4G and Long Term Evolution (LTE), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   detecting, by one or more processors, a transmission control protocol disconnection of a first distributed storage unit from a distributed storage network, wherein the distributed storage network comprises a set of distributed storage units;
   identifying, by one or more processors, a transaction, wherein:
   the transaction is not in a final state,
   the transaction is a first proposal, from the first distributed storage unit, for the set of distributed storage units to store a dataset with a first revision number within the distributed storage network, and
   the dataset is broken into one or more data pieces to be written on the set of distributed storage units of the distributed storage network that approve the proposal;
   identifying, by one or more processors, a timestamp of the transaction;
   determining, by one or more processors, a stage the transaction has reached;
   sending, by one or more processors, a read request for the transaction;
   receiving, by one or more processors, a read request return that a write threshold of the set of distributed storage units of the distributed storage network have approved the first proposal and the transaction has not been finalized; and
   placing, by one or more processors, the transaction in a final state based on the determined stage the transaction has reached by issuing finalize messages and cleanup messages and marking the transaction successful to remove previous revisions of data and failed proposals that competed with the first proposal.

2. The method of claim 1, wherein placing the transaction in a final state comprises, responsive to the timestamp of the transaction surpassing a predefined threshold, placing, by one or more processors, the transaction in a final state.

3. The method of claim 1, wherein determining a stage the transaction has reached further comprises determining, by one or more processors the stage the transaction has reached before the first distributed storage unit disconnected.

4. A computer program product comprising:
one or more computer readable storage media and program instructions stored on the one or more computer readable storage media, the program instructions comprising:
program instructions to detect a transmission control protocol disconnection of a first distributed storage unit from a distributed storage network, wherein the distributed storage network comprises a set of distributed storage units;
program instructions to identify a transaction, wherein:
the transaction is not in a final state,
the transaction is a first proposal, from the first distributed storage unit, for the set of distributed storage units to store a dataset with a first revision number within the distributed storage network, and
the dataset is broken into one or more data pieces to be written on the set of distributed storage units of the distributed storage network that approve the proposal;
program instructions to identify a timestamp of the transaction;
program instructions to determine a stage the transaction has reached;
program instructions to send a read request for the transaction;
program instructions to receive a read request return that a write threshold of the set of distributed storage units of the distributed storage network have approved the first proposal and the transaction has not been finalized; and
program instructions to place the transaction in a final state based on the determined stage the transaction has reached by issuing finalize messages and cleanup messages and marking the transaction successful to remove previous revisions of data and failed proposals that competed with the first proposal.

5. The computer program product of claim 4, wherein the program instructions to place the transaction in a final state comprise, responsive to the timestamp of the transaction surpassing a predefined threshold, program instructions to place the transaction in a final state.

6. The computer program product of claim 4, wherein the program instructions to determine a stage the transaction has reached further comprise program instructions to determine the stage the transaction has reached before the first distributed storage unit disconnected.

7. A computer system comprising:
one or more computer processors;
one or more computer readable storage media;
program instructions stored on the computer readable storage media for execution by at least one of the one or more processors, the program instructions comprising:
program instructions to detect a transmission control protocol disconnection of a first distributed storage unit from a distributed storage network, wherein the distributed storage network comprises a set of distributed storage units;
program instructions to identify a transaction, wherein:
the transaction is not in a final state,
the transaction is a first proposal, from the first distributed storage unit, for the set of distributed storage units to store a dataset with a first revision number within the distributed storage network, and
the dataset is broken into one or more data pieces to be written on the set of distributed storage units of the distributed storage network that approve the proposal;
program instructions to identify a timestamp of the transaction;
program instructions to determine a stage the transaction has reached;
program instructions to send a read request for the transaction;
program instructions to receive a read request return that a write threshold of the set of distributed storage units of the distributed storage network have approved the first proposal and the transaction has not been finalized; and
program instructions to place the transaction in a final state based on the determined stage the transaction has reached by issuing finalize messages and cleanup messages and marking the transaction successful to remove previous revisions of data and failed proposals that competed with the first proposal.

8. The computer system of claim 7, wherein the program instructions to place the transaction in a final state comprise, responsive to the timestamp of the transaction surpassing a predefined threshold, program instructions to place the transaction in a final state.

* * * * *